United States Patent
Wirola et al.

(10) Patent No.: US 8,355,758 B2
(45) Date of Patent: Jan. 15, 2013

(54) DETERMINING WHETHER A WIRELESS COMMUNICATION NODE IS STATIONARY BY EVALUATING CHANGES IN INFORMATION ABOUT PEER WIRELESS COMMUNICATIONS NODES

(75) Inventors: Lauri Wirola, Tampere (FI); Marion Hermersdorf, Lausanne (CH)

(73) Assignee: Nokia Corporation, Espoo (FI)

( * ) Notice: Subject to any disclaimer, the term of this patent is extended or adjusted under 35 U.S.C. 154(b) by 351 days.

(21) Appl. No.: 12/734,041

(22) PCT Filed: Oct. 12, 2007

(86) PCT No.: PCT/EP2007/060901
§ 371 (c)(1),
(2), (4) Date: Apr. 5, 2010

(87) PCT Pub. No.: WO2009/046767
PCT Pub. Date: Apr. 16, 2009

(65) Prior Publication Data
US 2010/0255781 A1    Oct. 7, 2010

(51) Int. Cl.
*H04B 1/38* (2006.01)
*H04W 36/00* (2009.01)
(52) U.S. Cl. .......... 455/574; 455/436; 455/41.2
(58) Field of Classification Search .......... 455/574, 455/436, 456.1, 41.2, 41.3, 423; 370/328, 370/331
See application file for complete search history.

(56) References Cited

U.S. PATENT DOCUMENTS

| 7,026,984 | B1 |  | 4/2006 | Thandu et al. |
| 7,181,214 | B1 | * | 2/2007 | White ........................ 455/435.1 |
| 2001/0046870 | A1 | * | 11/2001 | Stilp et al. ..................... 455/456 |
| 2004/0048618 | A1 | * | 3/2004 | O'neill et al. ................. 455/445 |
| 2004/0143842 | A1 | * | 7/2004 | Joshi ............................... 725/32 |
| 2004/0162819 | A1 | * | 8/2004 | Omae et al. ...................... 707/3 |
| 2004/0192347 | A1 | * | 9/2004 | Leizerovich et al. ....... 455/456.1 |
| 2004/0203820 | A1 | * | 10/2004 | Billhartz .................... 455/452.1 |
| 2005/0113124 | A1 |  | 5/2005 | Syrjarinne et al. |
| 2005/0185606 | A1 | * | 8/2005 | Rayment et al. ............. 370/328 |
| 2005/0228613 | A1 | * | 10/2005 | Fullerton et al. ............. 702/150 |
| 2006/0067286 | A1 | * | 3/2006 | Cornett ........................ 370/338 |
| 2007/0160009 | A1 | * | 7/2007 | Joshi ............................ 370/331 |
| 2007/0183344 | A1 |  | 8/2007 | Joshi |
| 2008/0316042 | A1 |  | 12/2008 | Scales |

FOREIGN PATENT DOCUMENTS

CN        101014169 A     8/2007

OTHER PUBLICATIONS

Office Action dated Aug. 3, 2012 in counterpart Chinese patent application No. 200780101029.7, 6 pages.
English language translation of Office Action dated Aug. 3, 2012 in counterpart Chinese patent application No. 2007801010291, 7 pages.

* cited by examiner

*Primary Examiner* — Lewis West
(74) *Attorney, Agent, or Firm* — Locke Lord LLP (57) ABSTRACT

For supporting a switch between different service modes of some service, it is determined whether a wireless communication node is stationary by evaluating changes in information about peer wireless communication nodes detected by the wireless communication node. The result of the determination is then used as a decision criterion whether to switch the service to one of at least two modes.

18 Claims, 6 Drawing Sheets

DETERMINING WHETHER A WIRELESS COMMUNICATION NODE IS STATIONARY BY EVALUATING CHANGES IN INFORMATION ABOUT PEER WIRELESS COMMUNICATIONS NODES

CROSS REFERENCE TO RELATED APPLICATIONS

This application is the U.S. National Stage of International Application Number PCT/EP2007/060901 filed on Oct. 12, 2007 which was published in English on Apr. 16, 2009 under International Publication Number WO 2009/046767.

FIELD OF THE INVENTION

The invention relates to the field of service mode selection.

BACKGROUND OF THE INVENTION

An example of a service, in which one of several modes may be used, would be a positioning system. The positioning system allows the determination of the position of a receiver of the positioning system by processing signals transmitted by beacons of the positioning system. This receiver may, for example, be used in a mode with reduced power consumption, which could also be a mode in which it is turned off completely, or in a fully operational mode.

There is an ever increasing number of devices using such a positioning system in order to determine their absolute position. Most often this is achieved by making use of a Global Navigation Satellite System (GNSS), of which the American global positioning system (GPS) and the European Galileo are but two examples. These systems enable a receiver to determine its position by just utilizing the downlink data sent by the respective set of satellites. There are also terrestrial localization techniques like cell identification and time difference of arrival (TDOA) that may be used for positioning which use only beacons on the ground rather than in space.

Problematic signal reception conditions in some urban environments, among other things, have led to the development of assisted GNSS (A-GNSS) technology for improving the performance of GNSS when signal quality is not optimal. A variety of approaches, which are characterized by the use of an assistance server, is subsumed under this category. An assistance server may have a better reception of signals and/or more computation power and additional information useful for positioning.

While originally the kind of devices having a GNSS receiver was limited, advances in miniaturization make it possible to use GNSS receivers in ever smaller and lighter devices. One exemplary kind of device to which this applies is the mobile phone. The positioning capability in mobile phones is most typically enabled by the use of either external or internal receivers. Moreover, the inherent communication capabilities of mobile phones enable a data exchange between the receiver and an assistance server The penetration of GNSS or A-GNSS enabled terminals is expected to increase significantly in the coming years. In 2011 it is estimated that approximately 30% of the terminals sold will have an internal AGNSS receiver. But it is not only positioning capability that is steadily added to mobile terminals. More and more functionality that was originally restricted to stationary computer systems is now a part of an increasing variety of mobile devices. This includes the ability to run platform-independent software like Java®, play back multimedia files and also connect to traditional computer systems and media with technology like universal serial bus (USB), Bluetooth® and wireless local area network (WLAN). Mobile phones, vehicle infotainment systems, personal digital assistants (PDAs) and mobile game consoles form an increasing variety of devices which all converge in their respective capabilities toward a mobile general-purpose computer. This trend towards multi-use terminals consisting of multiple processors, advanced camera and video features, multiple connectivity methods as well as navigation capability results in an ever increasing power consumption.

Also in the case of cellular based localization techniques, for which the device in question does not have to be a mobile phone in the strict sense but does have mobile communication capabilities nonetheless, such as a wrist watch with emergency mobile communications functionality, size and energy constraints may make it seem advantageous to have only intermittent connectivity to a cellular network.

Inertial sensors (or the consideration of the velocity solution, which is of less practical relevance in this context) can be used for detecting a motion of a device. If the inertial sensor detects that the mobile device is in fact stationary, then there is no need to continuously recalculate the current position based on the received signals. Consequently the positioning system receiver may be switched off or at least its power consumption decreased by reducing its measurement rate or a similar measure. Moreover, a more accurate position solution may be obtained if information on the state of motion of the receiver is available. If the receiver is known to be stationary, for example, a plurality of determined positions may be averaged.

It is to be understood that a switch between different available service modes may also be relevant to other types of services than positioning, and that service modes also do not necessarily relate to power consumption.

SUMMARY

A method is described which comprises determining whether a wireless communication node is stationary by evaluating changes in information about peer wireless communication nodes detected by the wireless communication node. The result of this determination is used as a decision criterion whether to switch a service to one of at least two modes.

Further, an apparatus is described which comprises at least one processing component that is configured to, firstly, determine whether a wireless communication node associated to the apparatus is stationary by evaluating changes in information about peer wireless communication nodes detected by the wireless communication node. Secondly, the component is configured to use a result of the determination as a decision criterion whether to switch a service to one of at least two modes.

The at least one processing component of the apparatus can be implemented in hardware and/or software. It may comprise for instance a processor executing software program code for realizing the required functions. Alternatively, it could be for instance a circuit that is designed to realize the required functions, for instance implemented in a chipset or a chip, like an integrated circuit. The described apparatus can be for example identical to the comprised processing component, but it may also comprise additional components. The apparatus could further be for example a module provided for integration into a device, like a wireless communication terminal or an accessory device for a wireless communication terminal.

Also described is a device comprising the apparatus as described above and in addition a user interface. This device may also comprise a receiver for a positioning system. Alternatively or in addition, this device may also comprise a wireless communication node.

Alternatively or yet in addition, this device may also be a mobile terminal.

Moreover, a computer program code is described, which realizes the described method when executed by a processor.

Further, a computer program product is described in which such a program code is stored in a computer readable medium. The computer program product could be for example a separate memory device, or a memory that is to be integrated in an electronic device.

Moreover, an apparatus is described that comprises means for determining whether a wireless communication node associated to the apparatus is stationary by evaluating changes in information about peer wireless communication nodes detected by the wireless communication node. The apparatus further comprises means for using a result of the determination as a decision criterion whether to switch a service to one of at least two modes.

Currently, the majority of mobile devices do not have inertial sensors integrated due to cost and size constraints. However, different wireless communication capabilities are increasingly added to devices. Many devices are provided with WLAN connectivity, Bluetooth® connectivity, or some other similar connectivity. These may be used to help determine whether the device is stationary or not without having to resort to a dedicated and expensive inertial sensor. Thus features that are conventionally employed for non-positioning functionality are used for motion detection. Depending on the result of the motion detection, a service may be switched into one of at least two different modes.

The invention thus provides low-cost and efficient means for detecting that a device is stationary. The node could already be a part of the device and primarily be used for some other functionality, allowing the detection of being stationary to be added at no additional cost in price or space.

The obtained motion information can be used for different services and different service modes.

In an exemplary embodiment, the at least two modes of the service of the method described above may comprise a mode with higher power consumption and a mode with lower power consumption.

The service may be for example a service provided by a receiver for a positioning system which is linked to the wireless communication node. The service may further be switched to a mode with reduced power consumption in case it has been determined that the wireless communication node is stationary.

Also the information of which a change is exploited can be of various kinds. The information about the peer wireless communication nodes may comprise for instance the number of peer wireless communication nodes detected by the wireless communication node.

If, for example, it has been determined that the number of peer wireless communication nodes detected by the wireless communication node is equal in two scans, then this information may be indicative that the wireless communication node is stationary. This indication is stronger, the greater the number of detected peer wireless communication nodes is.

The information about the peer wireless communication nodes may also comprise for instance an identification of each detected peer wireless communication node.

As a further example, if it has been determined that the identification of all peer wireless communication nodes detected by the wireless communication node is equal in two scans, then this information may also be indicative that the wireless communication node is stationary. This indication is also stronger, the greater the number of detected peer wireless communication nodes is.

In certain embodiments, this identification may comprise a machine access code number.

The information about the peer wireless communication nodes may also comprise for instance a signal strength of a signal received from each of the detected peer wireless communication nodes by the wireless communication node.

As yet another example, if it has been determined that the difference in signal strength of all or most peer wireless communication nodes detected by the wireless communication node in two scans is less than a predetermined threshold, then this information may also be indicative that the wireless communication node is stationary with a certain probability. This indication is also stronger, the greater the number of detected peer wireless communication nodes is.

It is to be understood that different types of information about peer communication nodes may also be considered in combination.

Determining whether the wireless communication node is stationary may, in one embodiment, comprise the following: The wireless communication node scans for peer wireless communication nodes to determine the number and identifications of the detected peer wireless communication nodes. Then the number of identical peer wireless communication nodes detected during the scan that were also detected during a previous such scan and the total number of peer wireless communication nodes that were detected during the scan is determined. The numerical proportion between this number of identical peer wireless communication nodes and the total number of peer wireless communication nodes is then evaluated to determine whether the wireless communication node is stationary.

Determining whether the wireless communication node is stationary may further comprise evaluating in addition a further value determined as a function of the total number of peer wireless communication nodes detected by the wireless communication node.

The greater the total number of detected peer wireless communication nodes is, the more important a relative change in the identities of the detected peer wireless communication nodes is. Also, the greater the total number of detected peer wireless communication nodes is, the more important the proportion of detected peer wireless communication nodes with significant change in their signal strength is. In order to simplify calculations, the possible numbers of detected peer wireless communication nodes may be grouped, each group being associated to a respective importance factor. To this end, for instance a look-up table could be employed.

Determining whether the wireless communication node is stationary may result for instance in a determination that either a location change of the wireless communication node occurred, or no location change of the wireless communication node occurred, or it is unsure whether a location change of the wireless communication node occurred.

For example, this determination may be made according to a numerical value that is indicative of the probability of a motion of a wireless communication node and that is obtained based on the available information about peer wireless communication nodes. If this value is above a first threshold, then it may be determined that the wireless communication node is not stationary. If this value is below a second threshold, which in this case would be lower than the first threshold, then it may be determined that the wireless communication node is stationary. If, on the other hand, this value is between the two threshold values, then it may be determined that it is unsure whether the wireless communication node is stationary or not.

The invention can be used for example for service modes of a positioning system service. The positioning system can be in particular, though not exclusively, a GNSS, like GPS, global navigation satellite system (GLONASS), satellite based augmentation system (SEAS), quasi-zenith satellite system (QZSS), local area augmentation system (LAAS) or a combination of these. LAAS makes use of pseudolites instead of true satellites, but these pseudolites are to be understood to be covered as well by the term satellite as used in this application. LAAS has the advantage that it enables a positioning under indoor conditions as well.

The exploited wireless communication capabilities can be, for example, though not exclusively, short to medium range wireless communication capabilities, like Bluetooth® capabilities, personal area network capabilities, Wibree™ capabilities or WLAN capabilities. Accordingly, the employed wireless communication node could be for example either a Bluetooth® wireless communication node, or a node of a personal area network, or a Wibree™ wireless communication node, or a station of a wireless local area network (WLAN), but also any other type of node enabling a wireless communication.

The invention can be employed for example in very small and lightweight electronics applications. It can be provided for professional use, but also for fun applications, such as a consumer entertainment electronics device like a mobile phone or a mobile game console.

The service mode in question is not restriced to a mode of a positioning receiver, nor is it restricted to relate to power consumption, nor is the information only about motion. Any other service which may advantageously be switched in one or two modes depending on information about the environment as provided by the present invention may be substituted for the positioning system as described for this exemplary embodiment of the present invention.

For example, a radio tuner may search for frequencies with better reception of specific radio stations when has been determined that the radio is not stationary. This functionality may be turned off when the radio is stationary.

As another example, a service making use of one or more sensors may be switched from an inactive mode to an active mode upon the detection of motion of a wireless communication node and/or switched to an inactive mode when it has been determined that the wireless communication node is stationary. Alternatively, the service may be switched from a mode with larger time intervals between measurements into a mode with more frequent measurements depending on the detected presence or absence of motion. Such sensors may include, but are not limited to, compasses, thermometers and barometers.

Compass direction, temperature, atmospheric pressure, etc, may contribute to an overall picture of a user's situation.

Yet another example would be a service for labeling digital data such as photos, videos or voice records. While it is determined that a wireless communication node is stationary, a mode may be selected in which all such digital data created in or near the node may be automatically labeled, for instance with location information about a last determined or manually entered position of the wireless communication node. On the other hand, once it has been determined that the wireless communication node is no longer stationary, a mode may be entered in which the digital data is, for example, no longer labeled at all, or labeled with the indication that the location information for the digital data is unknown, or labeled with continuously updated information from a positioning receiver.

Different profiles for mobile phone operation that can be activated when the user of the mobile phone is, for example, in a meeting, in a car or outdoors allow different configurations and services of the mobile phone to be active depending on environmental conditions. To give an example, the meeting profile generally deactivates an acoustic ring tone and activates the vibration functionality of the mobile phone. In a further example, the present invention may be analogously used to automatically switch to a first profile for a stationary operation and to a second profile for a moving operation. Different profiles may result for example in a ring tone being played back with a different volume.

Similarly, it would also be possible to offer applications and information, which are only useful during motion, to a user only whenever a motion is detected by switching to a corresponding service mode, and to offer applications and information, which are only useful while a user is stationary, to a user only whenever no motion is detected by switching to a corresponding service mode.

Another possible application for the present invention can be seen in the medical field. For health reasons, persons may be recommended to move or not move for certain times of day or for certain durations. In these cases, detecting that a wireless communication node carried by such a person is in motion according to the present invention may be used to switch a recorder into a service mode in which it is recording in digital memory that the person is moving. Thus afterwards it may be checked whether the actual time and duration of movement of the person during a day, a week or another period of time corresponds to the recommended time and duration of movement during this period.

Similarly, if a wireless communication node carried for instance by an elderly person is in a mode indicating that the node is not moving for a long time, then a call mode may be activated that alerts someone to check why the elderly person appears to be stationary.

It is to be understood that all presented exemplary embodiments may also be used in any suitable combination.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
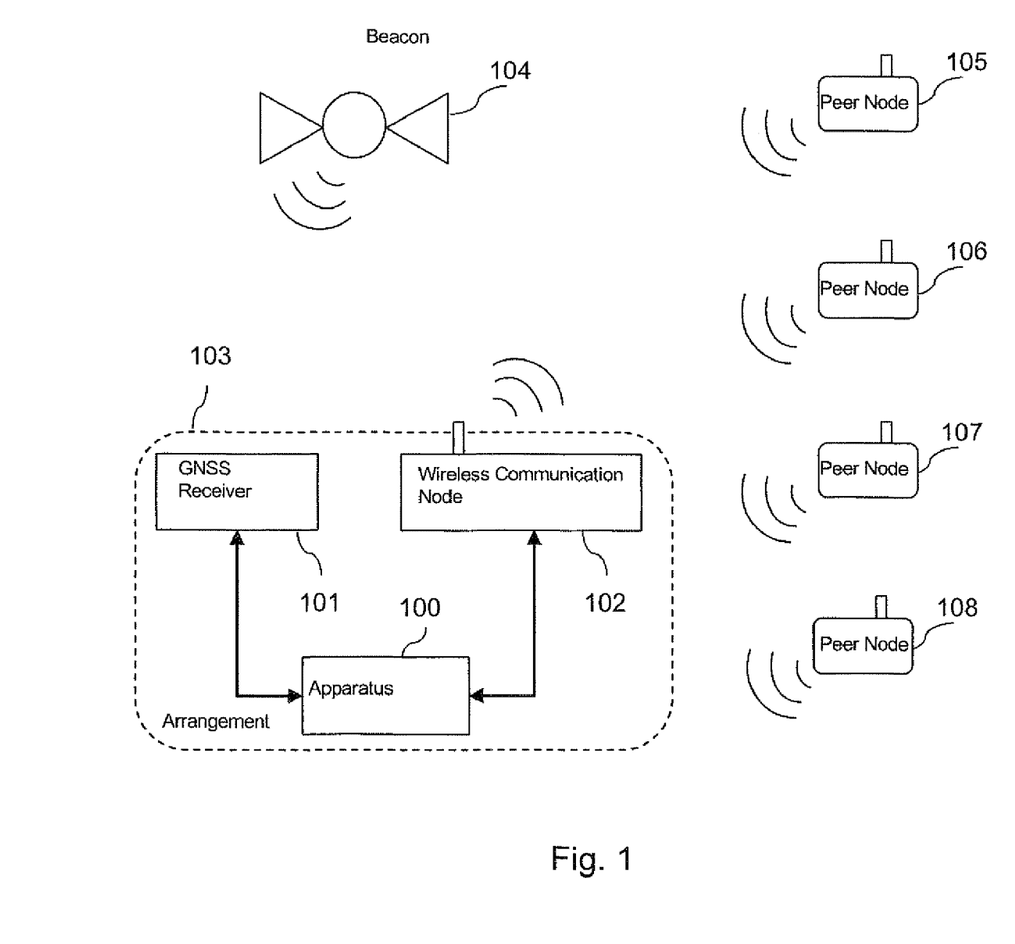
FIG. 1 is a diagram schematically illustrating a system in which an embodiment of the invention may be implemented.

FIG. 1 illustrates an exemplary system, in which a selection of a service mode based on information on wireless communication nodes can be implemented.

The system comprises an arrangement 103 including an apparatus 100, a GNSS receiver 101 and a wireless communication node 102. The system further comprises beacons 104 and various peer wireless communication nodes 105, 106, 107, 108.

The apparatus 100 of arrangement 103 comprises processing means configured to implement various algorithms. The processing means may for example be a microcontroller unit, a miniature computer, a dedicated integrated circuit implemented on a chip or a signal processor. The apparatus 100 is connected to receiver 101, which is configured to receive positioning signals from beacons 104. The beacons 104 may be satellites, terrestrial beacons or a combination of both. The receiver 101 may be for instance a receiver for a Global Navigation Satellite System, like GPS, Galileo or GLONASS, or for a terrestrial navigation system based on GSM localization techniques like cell identification and time difference of arrival (TDOA.

Only by way of example, it will be assumed in the following that the beacon 104 is a GPS satellite and that the receiver 101 is a GPS receiver.

The apparatus 100 may switch this receiver 101 in a mode with reduced power consumption. This can mean turning the receiver 101 off completely, or reducing its measurement rate, or if it is based on a microprocessor, switching it into sleep mode. The apparatus 100 may also switch the receiver 101 back into fully operational mode. Generally, but not necessarily, the apparatus 100 may also receive positioning information from the receiver 101. This may be the raw measured data from the receiver 101 or it may be already processed and determined position information. Thus, the actual processing of the positioning data may occur in the receiver 101 or in the apparatus 100.

The apparatus 100 is further connected to wireless communication node 102. This wireless communication node 102 may be based on any of a wide variety of wireless communication protocols. A list of examples, which is by no means exhaustive, includes Bluetooth® or Wireless Local Area Network (WLAN), like Wi-Fi®, Wibree™ or ZigBee®.

The arrangement 103 may be constituted by having apparatus 100, the receiver 101 and the wireless communication node 102 as separate but physically connected units or even devices connected by wires. Alternatively, any two of them may be combined in a device electrically connected to the distinct respective third component. In a further embodiment of the invention all three of the components apparatus 100, receiver 101 and wireless communication node 102 may be comprised in a single integrated device, which would then form arrangement 103.

As an example, arrangement 103 may be or comprise a mobile device, possibly a mobile phone, an electronic wrist watch, an mp3 player, or a similar device, either with an internal receiver 101 for a positioning system or a connection to an external such receiver 101 and further either comprising an internal wireless communication node 102 or electrically connected to an external such wireless communication node 102.

For example, the arrangement 103 may comprise a mobile phone with Bluetooth® functionality, i.e. a Bluetooth® device. Another example would be a mobile phone with Wibree™ functionality. As another example, the mobile phone may also have ZigBee® functionality. Yet another example could be a laptop computer that is also a WLAN station or a laptop computer with either an internal Bluetooth® device or connected to an external Bluetooth® device via a universal serial bus (USB), for example. This external Bluetooth® device may be a mobile phone with an internal GPS receiver 101. The arrangement 103 would thus comprise an apparatus 100, the laptop computer, electrically connected to a device comprising both the Bluetooth® wireless communication node 102, from which it may receive information, and the GPS receiver 101.

Only by way of example, it will be assumed in the following that the wireless communication nodes 102, 105-108 are Bluetooth® nodes.

The different wireless communication protocols differ widely in the kind of connections that they allow (point-to-point, point-to-multipoint) and how control over channels is arbitrated. Generally speaking, however, each node of the wireless communication protocol in question can detect and identify peer nodes 105-108 of the same protocol that are located within the respective range of the protocol. In addition, each node is able to perform some measurements on signals emitted by peer nodes by scanning and thus without being necessarily connected to these peer nodes, such as determining the respective signal strength of peer nodes that are within the range of the protocol.

Figure 2:
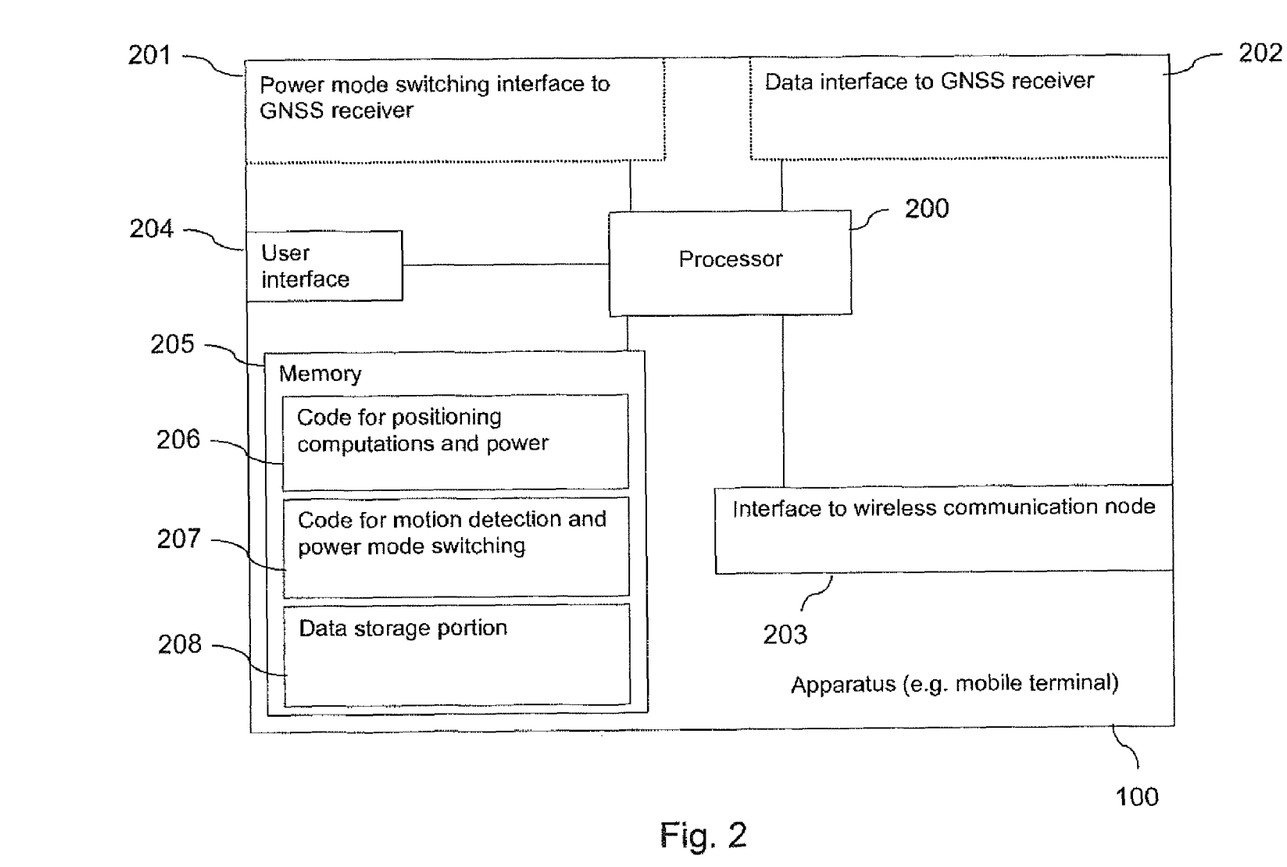
FIG. 2 is a schematic block diagram of an apparatus in the system of FIG. 1.

FIG. 2 illustrates a more detailed exemplary view of the apparatus 100. In this example, apparatus 100 is a microcontroller unit with a general purpose processor 200 running program code that implements the functionality of an embodiment of the present invention. The processor may also run program code for a wide variety of other functionalities concurrently, for example in separate threads or processes. The processor 200 has access to an interface 201 that may be used for switching the receiver 101 into a reduced power mode and also for switching it back to a fully operational mode. The processor 200 further has access to a data interface 202 to the receiver receiving positioning signals. The processor 200 may use information from the receiver 101 to determine its global position, for example by making GPS position calculations based on GPS data received from GPS receiver 101. The processor 200 also has access to a data interface 203 to the wireless communication node 102. The processor 200 may receive information about signals and peer wireless communication nodes 105-108 from wireless communication node 102 via this data interface 203.

The processor 200 also has access to data memory 205. This memory 205 may comprise random access memory (RAM) as well as read only memory (ROM). Three types of data that are relevant for the present invention are saved in this exemplary embodiment memory 205. Firstly, there is the program code 206 for the positioning system. This program code 206 implements all algorithms and procedures for processing the data received from the data interface 202 to the positioning system receiver 101. Secondly, there is the program code 207 for motion detection, which implements the functionality for determining whether or not the wireless communication node 102 interfaced by the data interface 203 is stationary or not and the functionality for causing a switch between different power modes of the GNSS receiver 103.

Thirdly, there is the data storage portion 208 used for saving data generated by the program code 206 for the positioning system and generated by the program code 207 for motion detection.

Figure 3:
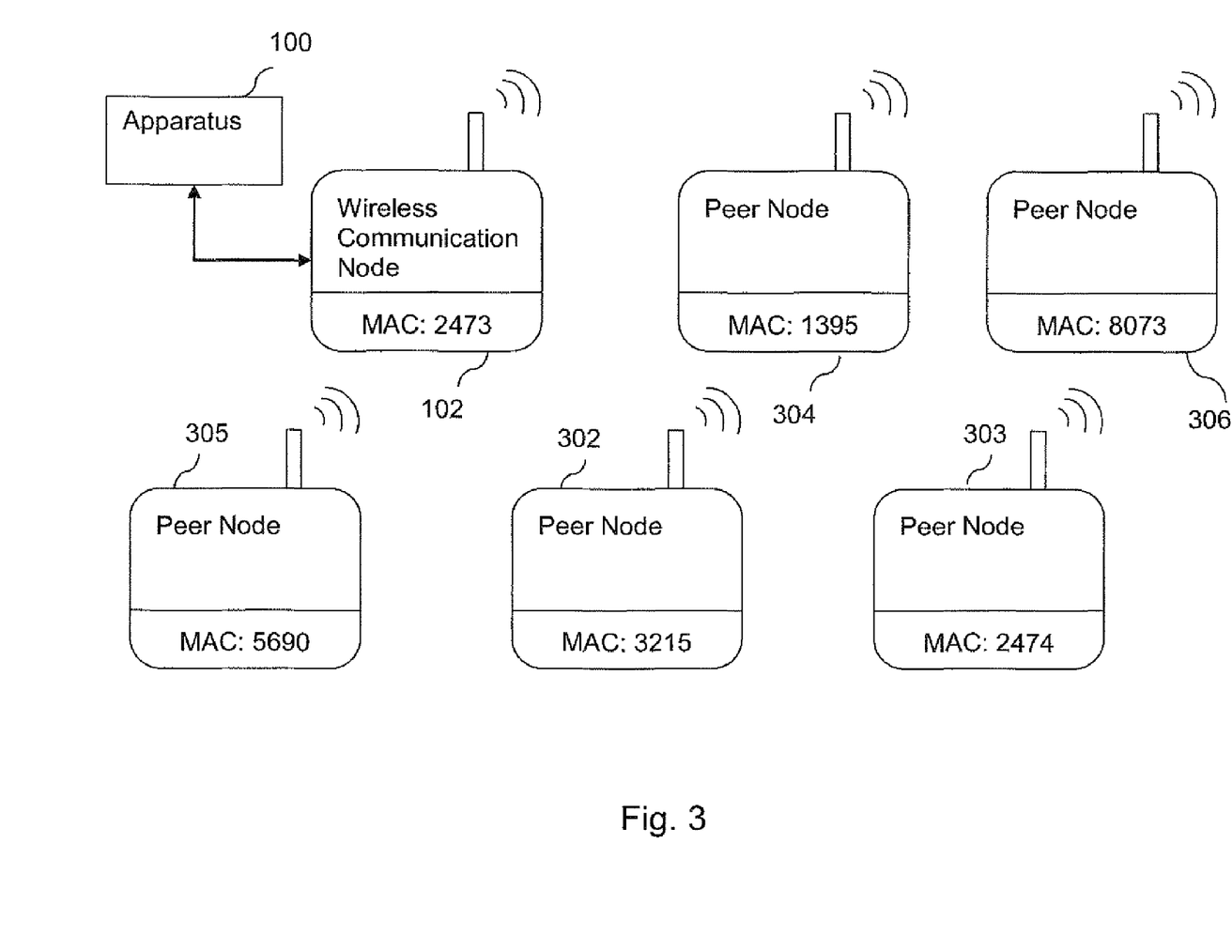
FIG. 3 is a diagram schematically illustrating an environment of the apparatus of the system of FIG. 1 during a first radio scan.

FIG. 3 illustrates the mobile apparatus 100 connected to the wireless communication node 102 as described above during a first radio scan of the wireless network environment by wireless communication node 102. At this time, there are present within the range of the wireless communication node 102 with MAC number 2473 a first peer wireless communication nodes 302 with MAC number 3215, a second peer wireless communication node 303 with MAC number 2474, a third peer wireless communication node 304 with MAC number 1395, a fourth peer wireless communication node 305 with MAC number 5690, and a fifth peer wireless communication node 306 with MAC number 8073.

Each wireless communication node, thus also in particular the wireless communication node 102 connected to the mobile apparatus 100, regularly and periodically scans the environment for peer wireless communication nodes. This radio scan can take place without establishing an actual connection to the peer wireless communication nodes in question, since it is a necessary precondition for doing so. In the wireless communication protocol, each wireless communication node is endowed with an identifier that is at least locally unique. That is, no two detected peer wireless communication nodes have the same identifier. In this particular embodiment of the present invention, this locally unique identifier may be the machine access code (MAC). The machine access code data communication sub-layer provides addressing and channel access control mechanisms that make it possible for all nodes to communicate within their respective network. It is a part of the data link layer or layer 2 of the seven-layer OSI model. The individual nodes may also be identified by other information if it is available. Thus, at any point in time, the wireless communication node 102 has information about how many and which peer wireless communication nodes are within the range determined by the respective wireless communication protocol. In FIG. 3, this is illustrated by the machine access code number given for the wireless communication node 102 and the peer wireless communication nodes 302-306.

In addition, generally the strength of the signal received from each peer wireless communication node is also determined at the wireless communication node 102. By regularly performing the radio scan, temporal variations in the strength of the signal received by each peer wireless communication node may be ascertained. The totality of information available about the peer wireless communication nodes is denoted radio fingerprint.

Some of these wireless communication nodes may be an integrated part of devices, which in turn may form a personal area network, which is a computer network used for communication among computer devices (including telephones and personal digital assistants) close to one person or to one particular device. A group of wireless communication nodes, for example Bluetooth® nodes, may form a piconet™, which is an ad-hoc computer network of all the other peer devices that are within range of each other. These networks may be formed automatically when two or more peer wireless communication nodes are in sufficient proximity and may be dissolved again when the respective wireless communication nodes are outside the range of the wireless communication protocol. Likewise, individual wireless communication nodes may join or leave such a network at any time.

Figure 4:
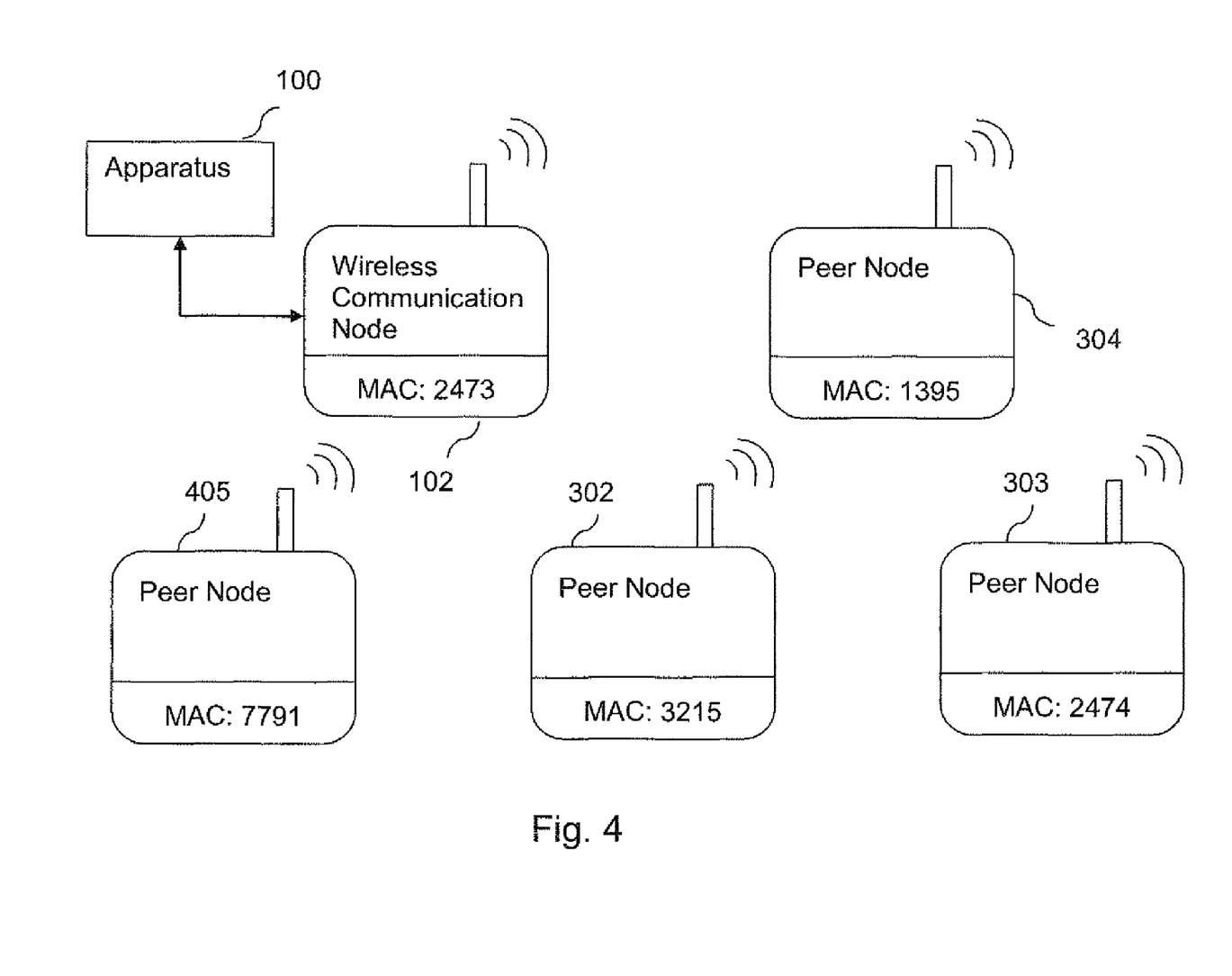
FIG. 4 is a diagram schematically illustrating an environment of the apparatus of the system of FIG. 1 during a second radio scan.

FIG. 4 illustrates mobile apparatus 100 connected to wireless communication node 102 during a second radio scan of the wireless network environment, i.e. at a time later than the radio scan illustrated by FIG. 3. The apparatus 100 and the wireless communication node 102 are identical to the mobile apparatus 100 and the wireless communication node 102, respectively, from FIG. 3. At this point in time, there are present within the range of the wireless communication node 102 a first peer wireless communication nodes 302 with MAC number 3215, a second peer wireless communication node 303 with MAC number, a third peer wireless communication node 304 with MAC number 1395, and a fourth peer wireless communication node 404, with MAC number 7791.

Based on these MAC numbers, it can be established that the first peer wireless communication node 302 of FIG. 4 is identical to the first peer wireless communication node 302 of FIG. 3, and that the second peer wireless communication node 303 of FIG. 4 is identical to the second peer wireless communication node 303 of FIG. 3. Also the fourth peer wireless communication node 304 of FIG. 4 is identical to the third peer wireless communication node 304 of FIG. 3.

The third peer wireless communication node 404 of FIG. 4 was not detected during the first radio scan. Likewise, the fourth peer wireless communication node 305 and the fifth peer wireless communication node 306 of FIG. 3 were not detected during the most recent radio scan. Thus, it may be concluded that during the second radio scan four peer wireless communication nodes were detected, of which three were already detected during the first radio scan as well.

Based on the information about wireless communication node 102's peers and the history of change of this information, i.e. the radio fingerprint and the history of its change, it may be probabilistically concluded whether or not the wireless communication node is stationary. The information about wireless communication node 102's peers and the history may also turn out to be inconclusive on whether or not the wireless communication node is stationary. Because wireless communication node 102 is physically connected to apparatus 100, the same result determining whether or not wireless communication node 102 is stationary may also be applied to apparatus 100. Thus in the following an observation of motion, an observation of no motion or an undecided result applies equally to both the wireless communication node 102 and apparatus 100 in all cases.

The radio fingerprint in any one of most places is widely constant or stable. When a wireless communication node or, by the same token, the apparatus connected to it moves, the radio fingerprint changes. Consequently, a significant change in the current radio fingerprint compared to the radio fingerprint of an earlier point in time can be used to detect movement of the wireless communication node. This is largely independent of the actual underlying wireless communication protocol. The greater the detected change is in the radio fingerprint, the higher the probability is for the wireless communication node not being stationary.

This change in the radio fingerprint manifests itself primarily, but not exclusively, in three ways. Firstly, the number of peer wireless communication nodes detected during a radio scan may change relative to a previous radio scan. Secondly, the identity of the detected peer wireless communication nodes relative to a previous radio scan may change, resulting in other peer wireless communication nodes being detected. And thirdly the strength of the signal received from an individual peer wireless communication node may change relative to a previous radio scan.

Detecting the presence or absence of motion allows saving energy on powering the GPS receiver 101. The GPS receiver 101 may be turned off or switched into a mode with lower power consumption, for example by reducing the measurement rate, when it has been concluded that the apparatus 100 is stationary. It may then be switched to fully operational mode again when it is detected that the apparatus 100 is not stationary anymore or after a predetermined time interval.

Also, detecting that the apparatus 100 is stationary for a certain period can be used for obtaining an accuracy gain in a positioning, since it allows averaging different positions that are obtained during this period.

Furthermore, if it was determined that the apparatus 100 was not stationary for a certain period of time, this period of time may be used to estimate a maximum distance of the current position from the last known position before the apparatus 100 was not stationary. For example, multiplying this period of time with an assumed maximum speed of the apparatus 100 yields a radius around the last known position within which the current position of the apparatus 100 can be estimated to lie.

Figure 5:
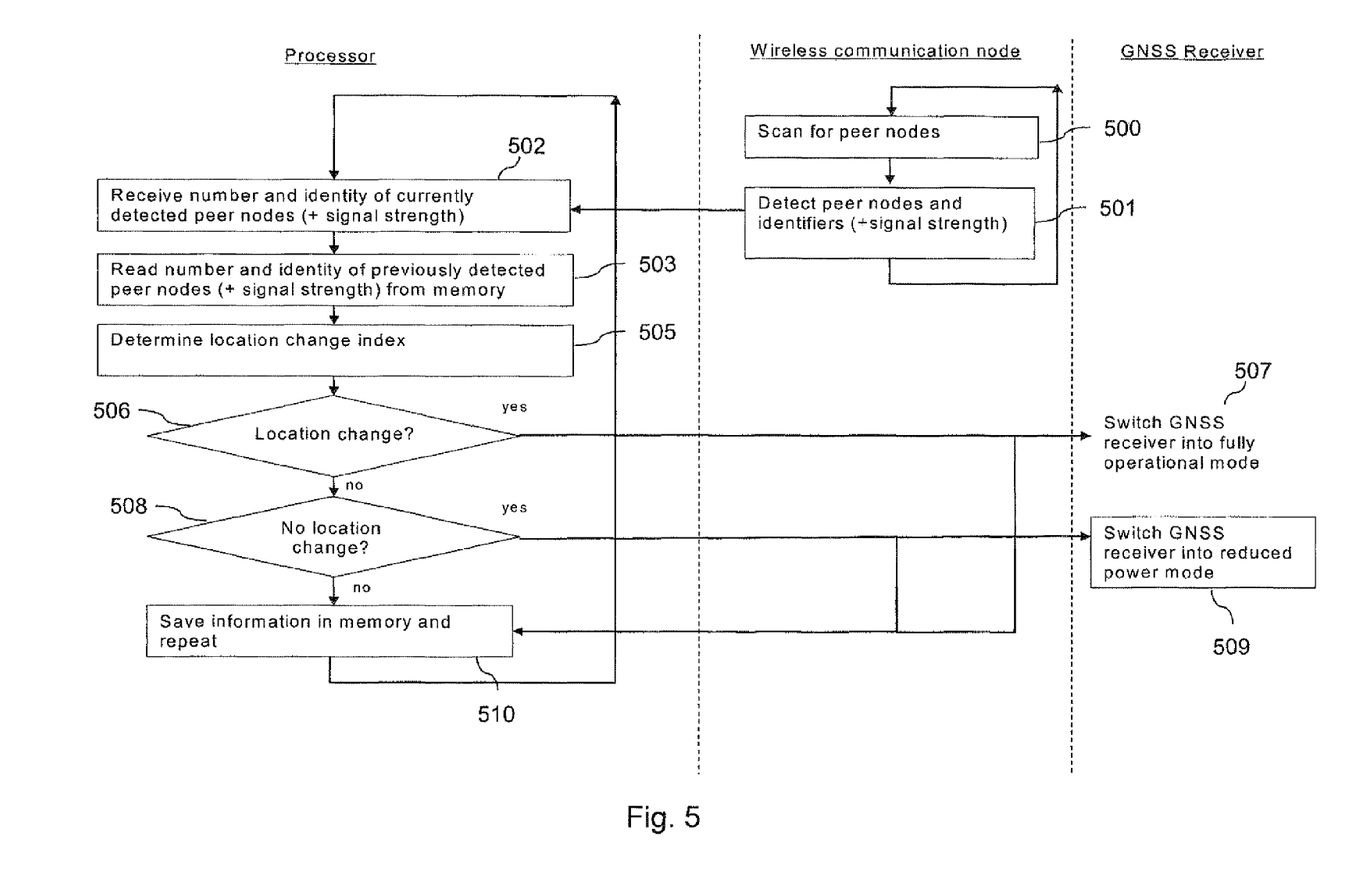
FIG. 5 is a flow chart illustrating an operation in the system of FIG. 1 in accordance with an exemplary embodiment of the invention.

FIG. 5 is an exemplary flow chart that describes a quantitative process with which it may be determined whether the wireless communication node 102 is stationary or not. The example takes Bluetooth® as the underlying wireless communication protocol. However any other wireless communication protocol that allows the detection and identification of peers within a given range may be used in an analogous and often identical way. Because this process may be used continuously, the process is presented as a looped process that takes place concurrently in the processor 200 and in the wireless communication node 102.

The loop of the wireless communication node 102 comprises a first step 500 and a second step 501. In the first step 500, a radio scan for peer wireless communication nodes takes place. In the second step 501, based on the radio scan of the first step 500, peer wireless communication nodes are detected and identified. In addition, the signal strength of the signal from each of the detected peer wireless communication nodes may be determined. This process is then repeated.

The processor 200, operating concurrently, receives the number and identity of the currently detected peer wireless communication nodes in a first step 502 from the wireless communication node 102. In addition, the processor 200 could receive the determined signal strength for each of the detected peer wireless communication nodes from the wireless communication node 102. The now following is a list of exemplary machine access code numbers of peer wireless communication nodes detected during this most recent radio scan:
000780005738
000fb399aba2
0020e0746006
000780800ed3
0010c6618de6
000eed9d68bc
000eed9d6b14
000eed9d68a1
0020e04b21be In a second step 503, the processor 200 determines the number and identity of peer wireless communication nodes detected during a previous scan. This is done by reading the previously saved information about the previous scan from the memory 205. The information comprises, in this example, the list of machine access code numbers of the peer wireless communication nodes detected during this previous scan.

The following is the list of exemplary machine access code numbers detected during the previous scan and read from the memory 205:
0020e04b21be
000eed9d68a1
000780005738
000eed9d6b14
000eed9d68bc
0020e0746006
0010c6618de6
0012d2275e5d In a third step 505, the processor 200 determines a location change index based on the information from a most recent radio scan and on the information from a previous scan. The radio scan immediately preceding the most recent radio scan suggests itself to be used as the previous scan, but another one before that may also be used.

The location change index ranges from 0, which means that it is most probable that the wireless communication node 102, and hence the apparatus 100 and the receiver 101 connected to it, are not stationary, to 1, which means that most probably the wireless communication node 102, and consequently also the apparatus 100 and the receiver 101 connected to it, are stationary.

If the wireless communication node 102 detected no peer wireless communication node during the most recent radio scan, the location change index is set to 0.5 without further proceedings until the next radio scan. It follows that for this point in time the method produced a result that is inconclusive on whether wireless communication node 102 and apparatus 100 connected to it are stationary or not. If any peer wireless communication node has been detected during the most recent radio scan, the location change index is determined by two parameters.

The first parameter of these two is an environmental change index ECI. The environmental change index is calculated by a division, wherein the dividend is given by the number of identical peer wireless communication nodes that were detected in the most recent scan and in the previous scan, multiplied by 100. The divisor is given by the total number of peer wireless communication nodes detected in the most recent scan. Thus the equation is given as follows:

$$ECI = \frac{IDs}{TOTs} \cdot 100,$$

wherein IDs is the number of identical peer wireless communication nodes that were detected in the most recent scan and in the previous scan, and wherein TOTs is the total number of peer wireless communication nodes detected in the most recent scan. The environmental change index essentially provides the percentage of peer wireless communication nodes that has stayed identical from the previous radio scan to the most recent one.

In the Bluetooth® protocol, the locally unique identifier of the data link layer is the machine access code number, and each wireless communication protocol should have such or an equivalent number for at least locally unique identification. By comparing the list of machine access code numbers of detected peer wireless communication nodes from the most recent radio scan with the list of machine access code numbers of detected peer wireless communication nodes from a previous scan, the number of identical peer wireless communication nodes can be determined.

The machine access code (MAC address) is the machine access code number of the Ethernet protocol. In cases where the internet protocol (IP) is used over an underlying protocol that is not Ethernet, an analogous existing identification number of the underlying protocol is often interpreted as being the MAC address for the purposes of the internet protocol. In a situation where internet protocol is used over a wireless network, this equivalent MAC address may thus be interpreted as the machine access code number for the purpose of wireless communication node identification in the context of the present invention as well.

As an illustrative example, the following is again the list of peer wireless communication nodes detected during the most recent radio scan, where additionally the peer wireless communication nodes that were also detected during the previous radio scan are denoted by an (x).

000780005738 (x)
000fb399aba2
0020e0746006 (x)
000780800ed3
0010c6618de6 (x)
000eed9d68bc (x)
000eed9d6b14 (x)
000eed9d68a1 (x)
0020e04b21be (x)

The most recent radio scan detected 9 peer wireless communication nodes, of which 7 are identical to the peer wireless communication nodes detected during a previous radio scan. In this case then, the environmental change index is given by $$ECI = \frac{IDs}{TOTs} \cdot 100 = \frac{7}{9} \cdot 100 \approx 77.78$$

If the wireless communication node 102 determines as well the signal strength of signals from peer wireless communication nodes and provides the results to the processor 200, the processor 200 may further reduce the number of identical peer wireless communication nodes IDs by those identical peer wireless communication nodes for which the detected signal strength varies significantly from one scan to the next.

Alternatively, an equation for IDs may be used that takes into account significant changes in the signal strength of peer wireless communication node that are identical to peer wireless communication nodes detected during a previous scan. In this alternative case IDs is given by $$IDs = N_{Seq} + N_{Sch} \cdot \frac{1}{2}$$

where $N_{Seq}$ is the number of identical peer wireless communication nodes that are identical to peer wireless communication nodes detected during a previous scan with no significant change in signal strength between the two scans and $N_{Sch}$ is the number of identical peer wireless communication nodes that are identical to peer wireless communication nodes detected during a previous scan with significant change in signal strength between the two scans. This is only an exemplary method of taking this signal strength change into account and others are possible.

The second parameter by which the location change index is determined is the environmental change importance factor. The environmental change importance factor is determined as a function of the total number of peer wireless communication nodes detected during the most recent radio scan and can be implemented as simple look-up table, as given by the following example:

| Number of peer wireless communication nodes | environmental change importance factor |
|---|---|
| 0 or 1 | 0 |
| 2 | 1 |
| 3 | 2 |
| ... | ... |
| 10 | 9 |
| >10 | 10 |

The more peer wireless communication nodes are detected, the more significant a relative change in the number of identical peer wireless communication nodes from the previous radio scan to the most recent one becomes. If there is only a single peer wireless communication node it may be one of a mobile phone of another person. The scanning node 102 may be stationary, and the other person may move away, resulting in a change in the radio fingerprint even though the node 102 is in fact stationary. On the other hand, the other person may also be moving together with the scanning node 102, thus indicating no change in the radio fingerprint even though the node 102 is in fact not stationary. With a large number of peer wireless communication nodes detected by the radio scan, it is more likely that a change in the radio fingerprint does indicate that the apparatus 100 and the receiver 101 connected to the node 102 are not stationary.

The environmental change index and the environmental change importance factor together determine the location change index. The location change index may for example be given by a set of curves, described by functions of the environmental change index, where the appropriate curve or function is determined by the environmental change importance factor. In general, for higher values of the environmental change importance factor, the derivative of the function for the location change index with respect to the environmental change index will be higher as well.

Thresholds may be determined such that if the location change index exceeds one threshold, it is determined that the wireless communication node 102 is not stationary. If the location change index goes below another threshold, it is determined that the wireless communication node 102 is stationary. If the location change index neither exceeds the first threshold nor goes below the second threshold, then no conclusive determination can be made.

Figure 6:
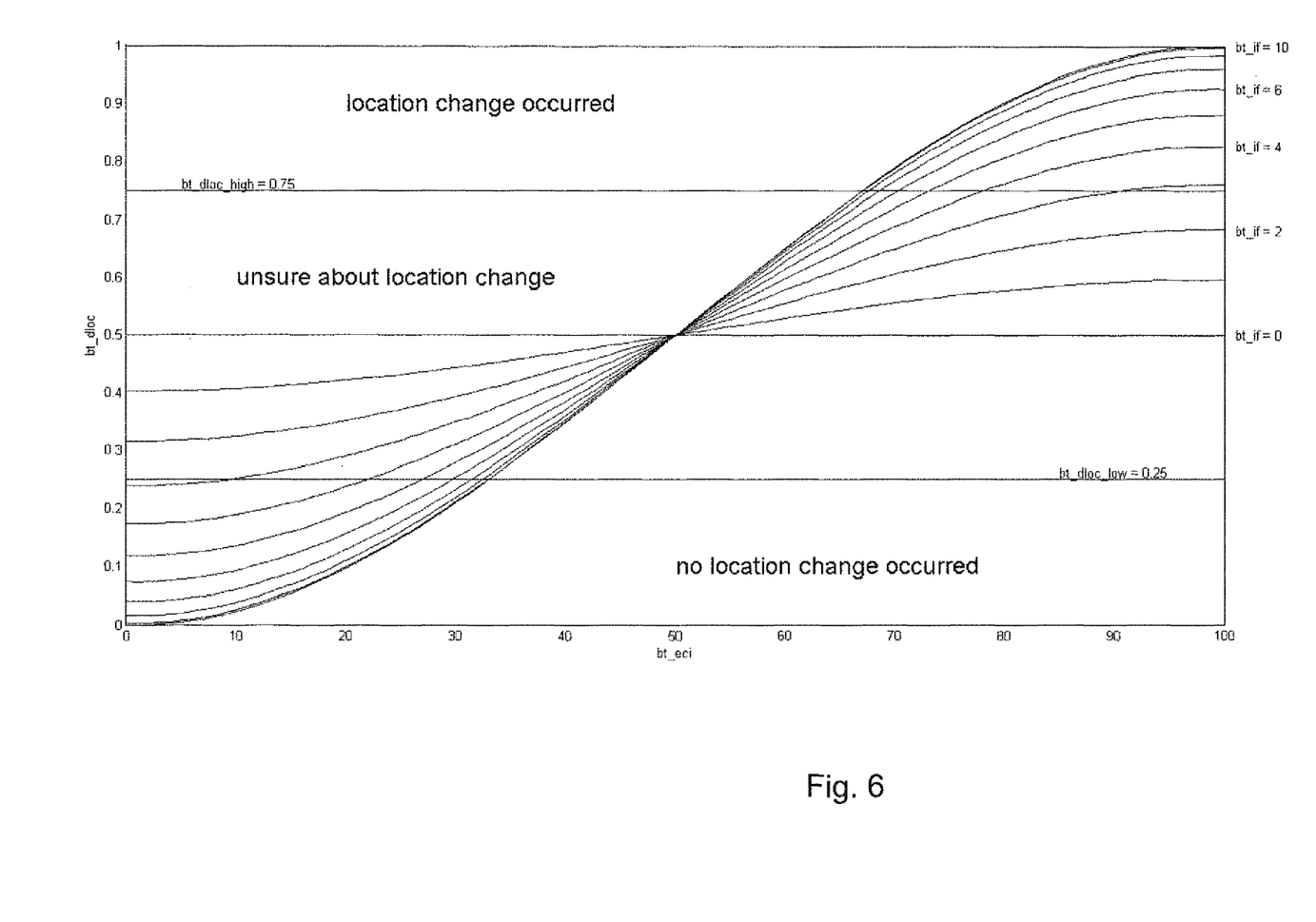
FIG. 6 is a diagram from which a determination may be made whether the apparatus of the system of FIG. 1 is stationary or not based on available information.

FIG. 6 shows an exemplary set of curves, according to which the location change index bt_dloc may be determined based on the environmental change index bt_eci and the environmental change importance factor bt_if. From the location change index it follows whether the wireless communication node 102 is stationary or not, or whether the location change index allows no conclusion in this question.

In FIG. 6, the threshold above which the location change index indicates that a location change has occurred has been exemplarily set to 0.75. The threshold below which the location change index indicates that a location change has not occurred has been exemplarily set to 0.25. In this particular example, if the location change index is between 0.25 and 0.75, no conclusion may be drawn about whether or not the wireless communication node 102 is stationary. The relative amount of change of the wireless network environment is represented by the environmental change index. The value of the environmental change index necessary to make such a determination varies with the importance factor which is a function of the number of peer wireless communication nodes detected during the radio scan. In this particular example, an importance factor of 2 will not provide a conclusive determination no matter what the environmental change index is. On the other hand, for an importance factor of 10 any environmental change index below 0.33 or above 0.66 will result in a determination on whether or not the wireless communication node 102 is stationary, according to this example.

In a fourth step 506, after the location change index has been calculated in the third step 505, the processor 200 compares the calculated location change index with the threshold for determining whether a location change has occurred. If from the calculated location change index it can be determined that a location change has occurred, it follows as an operation 507 on the positioning system receiver 101 that the positioning system receiver 101 is switched into fully operational mode.

If none of a predetermined number of consecutive iterations has resulted in the determination that a location change has occurred, then the positioning system receiver 101 may be switched into fully operational mode without such a determination being made based on the location change index. This is to verify by means of the positioning system receiver 101 that in the period of time corresponding to the predetermined number of iterations no location change has indeed occurred. If after this verification it is still not determined that a location change has occurred, the receiver 101 may be switched back into a mode with reduced power consumption.

If it has been determined that a location change has occurred, the processor 200 then proceeds to the final step 510 of this iteration, in which the information about the most recent radio scan is saved in the memory 205. The same process may then be repeated for the next point in time by starting again with the first step 502.

If it has not been determined that a location change has occurred, the processor 200 compares the calculated location change index with the threshold for determining that a location change has not occurred in a fifth step 508. If from the calculated location change index it can be determined that a location change has not occurred, it follows as an operation 509 on the positioning system receiver 101 that the positioning system receiver 101 is switched into a mode with reduced power consumption.

If neither a determination was made in the fourth step 506 that a location change has occurred, nor a determination was made in the fifth step 508 that no location change has occurred, it follows that generally the positioning system receiver 101 remains in the state that it is in, unless the elapse of a predetermined number of iterations as described for the fourth step 506 results in the positioning system receiver 101 to be switched into fully operational mode or unless the positioning system receiver 101 is switched by a process outside this presently described process for motion detection.

The processor 200 then proceeds in any case to the final step 510 of this iteration, in which the information about the most recent radio scan is saved in the memory 205 and a new iteration may be started beginning at the first step 502.

The information whether or not the apparatus is stationary may also be used for a wide variety of other applications, of which context awareness is but one example. Thus the information that the apparatus is stationary or not may be used to supplement a part of a more comprehensive set of information about the environment of the apparatus. Combined with other detection means, for example for optical signals, acoustic signals, or tactile signals, the motion detection functionality of the present invention may be used to help make a determination among different scenarios consistent with the information received from other detection means.

Moreover, the intermediate parameters environmental change index and importance factor may also supply information indicative of more general information about the environment of the apparatus. For example, in the wilderness or in rural areas, not many Bluetooth® devices, WLAN access points and the like are to be expected. On the other hand, these kinds of devices tend to concentrate within office buildings or in crowded urban areas near buildings. Thus these parameters may support the determination of the general kind of environment that the apparatus is in.

It is to be understood that the same or a similar detection of a location change could equally be used for controlling the power modes of other components than a positioning system receiver. Further, it could equally be used for switching between other modes than power modes of any component.

The functions illustrated by the processor 200 executing program code 207 can be viewed as means for determining whether a wireless communication node is stationary by evaluating changes in information about peer wireless communication nodes detected by the wireless communication node and as means for using a result of the determination as a decision criterion whether to switch a service to one of at least two modes.

The program code 207 can also be viewed as comprising such means in the form of functional modules.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
  determining whether a wireless communication node is stationary by scanning for peer wireless communication nodes by the wireless communication node to determine the number and identifications of detected peer wireless communication nodes, determining the number of identical peer wireless communication nodes detected by the wireless communication node that were also detected by the wireless communication node during a previous scanning and the total number of peer wireless communication nodes detected by the wireless communication node, and evaluating a numerical proportion between the number of identical peer wireless communication nodes detected by the wireless communication node that were also detected by the wireless communication node during a previous scanning and the total number of peer wireless communication nodes detected by the wireless communication node to determine whether the wireless communication node is stationary; and
  using a result of the determination as a decision criterion whether to switch a service to one of at least two modes.

2. The method according to claim 1 wherein the at least two modes of the service comprise a mode with higher power consumption and a mode with lower power consumption.

3. The method according to claim 1, wherein the service is a service provided by a receiver for a positioning system which is linked to the wireless communication node, and wherein the service is switched to a mode with reduced power consumption in case it has been determined that the wireless communication node is stationary.

4. The method according to claim 1, wherein determining whether the wireless communication node is stationary comprises evaluating in addition a further value determined as a function of the total number of peer wireless communication nodes detected by the wireless communication node.

5. The method according to claim 1, wherein determining whether the wireless communication node is stationary results in a determination that either a location change of the wireless communication node occurred, or no location change of the wireless communication node occurred, or it is unsure whether a location change of the wireless communication node occurred.

6. The method according to claim 1, wherein the service is a service provided by a global navigation satellite system receiver.

7. The method according to claim 1, wherein the wireless communication node is one of:
- a Bluetooth® wireless communication node;
- a node of a personal area network;
- a Wibree™ wireless communication node; and
- a station of a wireless local area network 8. An apparatus comprising at least one processor and at least one memory including computer program code, the at least one memory and the computer program code configured to, with the at least one processor, cause the apparatus at least to perform:
- determine whether a wireless communication node associated to the apparatus is stationary by causing a scanning for peer wireless communication nodes by the wireless communication node to determine the number and identifications of detected peer wireless communication nodes, determining the number of identical peer wireless communication nodes detected by the wireless communication node that were also detected by the wireless communication node during a previous scanning and the total number of peer wireless communication nodes detected by the wireless communication node, and evaluating a numerical proportion between the number of identical peer wireless communication nodes detected by the wireless communication node that were also detected by the wireless communication node during a previous scanning and the total number of peer wireless communication nodes detected by the wireless communication node to determine whether the wireless communication node is stationary; and
- use a result of the determination as a decision criterion whether to switch a service to one of at least two modes.

9. The apparatus according to claim 8, wherein the at least two modes of the service comprise a mode with higher power consumption and a mode with lower power consumption.

10. The apparatus according to claim 8, wherein the service is a service provided by a receiver for a positioning system which is linked to the wireless communication node, and wherein the at least one memory and the computer program code are configured to, with the at least one processor, cause the apparatus to switch the service to a mode with reduced power consumption in case it has been determined that the wireless communication node is stationary.

11. The apparatus according to claim 8, wherein the information about the peer wireless communication nodes comprises an identification of each detected peer wireless communication node.

12. The apparatus according to claim 8, wherein the at least one memory and the computer program code are configured to, with the at least one processor, cause the apparatus to determine whether the wireless communication node is stationary by evaluating in addition a further value determined as a function of the total number of peer wireless communication nodes detected by the wireless communication node.

13. The apparatus according to claim 8, wherein the at least one memory and the computer program code are configured to, with the at least one processor, cause the apparatus to determine whether the wireless communication node is stationary comprising determining that either a location change of the wireless communication node occurred, or no location change of the wireless communication node occurred, or it is unsure whether a location change of the wireless communication node occurred.

14. The apparatus according to claim 8, wherein the positioning system is a global navigation satellite system.

15. The apparatus according to claim 8, wherein the wireless communication node is one of:
- a Bluetooth® wireless communication node;
- a node of a personal area network;
- a Wibree™ wireless communication node; and
- a station of a wireless local area network.

16. The apparatus according to claim 8 further comprising at least one:
- a user interface;
- a receiver for a positioning system;
- a global navigation satellite system receiver; and
- a wireless communication node.

17. The apparatus according to claim 8, wherein the apparatus is a mobile terminal.

18. A computer readable medium in which a program code is stored, the program code causing an apparatus to perform the following when executed by a processor:
- determine whether a wireless communication node is stationary by causing a scanning for peer wireless communication nodes by the wireless communication node to determine the number and identifications of detected peer wireless communication nodes, determining the number of identical peer wireless communication nodes detected by the wireless communication node that were also detected by the wireless communication node during a previous scanning and the total number of peer wireless communication nodes detected by the wireless communication node, and evaluating a numerical proportion between the number of identical peer wireless communication nodes detected by the wireless communication node that were also detected by the wireless communication node during a previous scanning and the total number of peer wireless communication nodes detected by the wireless communication node to determine whether the wireless communication node is stationary; and
- use a result of the determination as a decision criterion whether to switch a service to one of at least two modes.

* * * * *